US009426177B2

(12) United States Patent
Wang et al.

(10) Patent No.: US 9,426,177 B2
(45) Date of Patent: Aug. 23, 2016

(54) METHOD AND APPARATUS FOR DETECTING SECURITY VULNERABILITY FOR ANIMATION SOURCE FILE

(71) Applicant: Tencent Technology (Shenzhen) Company Limited, Shenzhen (CN)

(72) Inventors: Jinding Wang, Shenzhen (CN); Weiting Chen, Shenzhen (CN); Xiaoguang Tan, Shenzhen (CN); Peiwei Wang, Shenzhen (CN); Yue Wang, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 70 days.

(21) Appl. No.: 14/501,897

(22) Filed: Sep. 30, 2014

(65) Prior Publication Data
US 2015/0020205 A1    Jan. 15, 2015

Related U.S. Application Data

(63) Continuation of application No. PCT/CN2014/081643, filed on Jul. 4, 2014.

(30) Foreign Application Priority Data

Jul. 15, 2013    (CN) .......................... 2013 1 0295820

(51) Int. Cl.
*H04L 29/06*    (2006.01)
*G06F 21/56*    (2013.01)

(52) U.S. Cl.
CPC ............ *H04L 63/168* (2013.01); *G06F 21/563* (2013.01); *H04L 63/1466* (2013.01)

(58) Field of Classification Search
CPC .. H04L 63/168; H04L 63/1466; G06F 21/563
USPC ........................................................ 726/25, 22
See application file for complete search history.

(56) References Cited

U.S. PATENT DOCUMENTS 7,284,274 B1 * 10/2007 Walls ........................ G06F 8/70
                                                     726/22
8,713,679 B2 *  4/2014 Zorn ........................ G06N 7/005
                                                     713/187

(Continued)

FOREIGN PATENT DOCUMENTS

CN    101017458 A    8/2007
CN    101482847 A    7/2009

(Continued)

OTHER PUBLICATIONS

International Search Report for corresponding PCT application No. PCT/CN2014/081643, dated Oct. 9, 2014, 4p.

*Primary Examiner* — Sarah Su
(74) *Attorney, Agent, or Firm* — Brinks Gilson & Lione

(57) ABSTRACT

A method for detecting a security vulnerability for an animation source file is provided. The method may include: decompiling the animation source file and acquiring a program structure and a syntactic model of the animation source file; converting the program structure and the syntactic model into an abstract syntax tree (AST); constructing symbol tables and function summaries based on the AST; and performing a taint backtracking on the symbol tables and the function summaries and detecting whether the animation source file has the security vulnerability according to a vulnerability rule.

20 Claims, 5 Drawing Sheets

(56) References Cited

U.S. PATENT DOCUMENTS

| | | | |
|---|---|---|---|
| 8,806,456 B2* | 8/2014 | Gazzillo | G06F 8/423 717/142 |
| 2007/0083933 A1* | 4/2007 | Venkatapathy | G06F 21/577 726/25 |
| 2012/0215887 A1* | 8/2012 | Xia | H04L 67/34 709/217 |
| 2013/0167241 A1* | 6/2013 | Siman | G06F 8/433 726/25 |
| 2014/0283081 A1* | 9/2014 | Sheridan | G06F 21/577 726/25 |

FOREIGN PATENT DOCUMENTS

| | | |
|---|---|---|
| CN | 101661543 A | 3/2010 |
| CN | 102945203 A | 2/2013 |
| CN | 102955914 A | 3/2013 |

* cited by examiner

METHOD AND APPARATUS FOR DETECTING SECURITY VULNERABILITY FOR ANIMATION SOURCE FILE

This application is a continuation of International application PCT/CN2014/081643, filed on Jul. 4, 2014 which claims the priority to Chinese Patent Application No. 201310295820.3, entitled "METHOD AND APPARATUS FOR DETECTING SECURITY VULNERABILITY FOR ANIMATION SOURCE FILE", filed with the Chinese State Intellectual Property Office on Jul. 15, 2013, which are incorporated by reference in their entirety herein.

FIELD

The disclosure relates to the technical filed of computer, and particularly to security detection of computer programs.

BACKGROUND

As the development of network technology, various network applications such as network games, electronic trading and social applications are indispensable. Currently, animations are widely used in these network applications, and flash animation (with the file name extension being .swf) provided by Adobe company is most widely used in these animations. The flash animation supports a powerful action script (AS) and thus supports rich functionalities for displaying web pages. However, some unsafe factors exist due to the powerful functionalities and the openness of the AS. Common security vulnerabilities include cross-site scripting (XSS) and cross-site flash (XSF).

Currently, common methods for detecting flash security vulnerability include a static analysis method and a dynamic analysis method. The static analysis method can be implemented in a semi-automatic manner or in an automatic manner.

In the semi-automatic manner, a key function is positioned by artificially reviewing source codes and whether parameters of the key function are externally controllable is checked, which takes a lot of time and human resources.

In the automatic manner, AS source codes are acquired by decompilation and matching is performed based on vulnerability code features to perform security detection. For example, a decompiled AS code segment is getURL (_root-.gourl, _blank), the vulnerability can be found by searching for a key function getURL in the codes and determining whether a parameter is an external input _root.*. This solution can be realized automatically but has a limited detection capability since only a single line of codes are detected.

SUMMARY

In view of the above, the disclosure provides a method and an apparatus for detecting a security vulnerability for an animation source file, which increases coverage of the vulnerability detection.

A method for detecting a security vulnerability for an animation source file includes: decompiling the animation source file and acquiring a program structure and a syntactic model of the animation source file; converting the program structure and the syntactic model into an abstract syntax tree (AST); constructing symbol tables and function summaries for functions of the animation source file based on the AST, where each function of the animation source file corresponds to one symbol table and one function symbol; and performing a taint backtracking on the symbol tables and the function summaries and detecting whether the animation source file has the security vulnerability according to a pre-registered vulnerability rule.

An apparatus for detecting a security vulnerability for an animation source file includes: an decompilation analyzing module configured to decompile the animation source file and acquire a program structure and a syntactic model of the animation source file; an abstract syntax tree (AST) constructing module configured to convert the program structure and the syntactic model into an AST; a symbol table constructing module configured to construct symbol tables for functions of the animation source file based on the AST, where each function of the animation source file corresponds to one symbol table; a function summary constructing module configured to construct function summaries for functions of the animation source file based on the AST, where each function of the animation source file corresponds to one function symbol; and a taint backtracking module configured to perform a taint backtracking on the symbol tables and the function summaries and detect whether the animation source file has the security vulnerability according to a pre-registered vulnerability rule.

In the method and apparatus for detecting the security vulnerability for the animation source file described above, the animation source file may be converted into the AST automatically, and the symbol table and the function summary are constructed based on the AST. In this way, whether a variable indicates that the animation source file has the security vulnerability can be backtracked in an infinite iteration way, and transfer of external malicious data in the program and generation of the vulnerability can be backtracked. Therefore, the detection rate for the vulnerability is improved.

DETAILED DESCRIPTION

The technical solutions according to the embodiments of the present invention will be described clearly and completely below in conjunction with the accompany drawings of the embodiments of the present invention. It is obvious that the described embodiments are only part of embodiments of the present invention. All other embodiments obtained by those skilled in the art based on the embodiments in the present invention without any creative work belong to the protection scope of the present invention.

Figure 1:
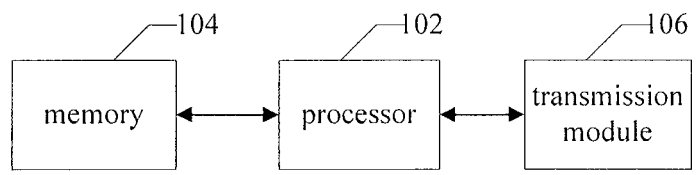
FIG. 1 is a structural diagram of a computer.

It is provided a method for detecting a security vulnerability for an animation source file, which may be performed by a computer or an apparatus similar to the computer. FIG. 1 is a structural diagram of the computer which may perform the method for detecting a security vulnerability for an animation source file. As shown in FIG. 1, the computer 100 includes one or more processors 102 (only one processor is shown in FIG. 1), a memory 104 and a transmission unit 106. It can be understood by those skilled in the art that the structure shown in FIG. 1 is just a schematic structure, which does not limit the structure of the computer. For example, the computer 100 may further include more or less components than those shown in FIG. 1, or may have a configuration different from that shown in FIG. 1.

The memory 104 may be configured to store a software program and module, such as a program instruction/module corresponding to a cross-terminal input method, apparatus and system in the embodiment of the invention. The processor 102 performs various function applications and data processing by running the software program and module stored in the memory 104, to implement the cross-terminal input method, apparatus and system mentioned above. The memory 104 may include a high-speed random memory and a non-volatile memory such as one or more magnetic storage devices, a flash memory or other non-volatile solid state memory. In some embodiments, the memory 104 may further include a memory located remotely from the processor 102. The remote memory may be connected to the computer 100 over a network. The network includes but not limited to internet, intranet, a local area network, a mobile communication network and a combination thereof.

The transmission unit 106 is configured to receive or send data via a network. The network may be a wire network and/or a wireless network. In an example, the transmission unit 106 includes a Network Interface Controller (NIC), which may be connected to other network device and a router via a network cable, so as to communicate with the internet. In another example, the transmission unit 106 is a Radio Frequency (RF) unit, which is configured to communicate with the internet in a wireless way.

Figure 2:
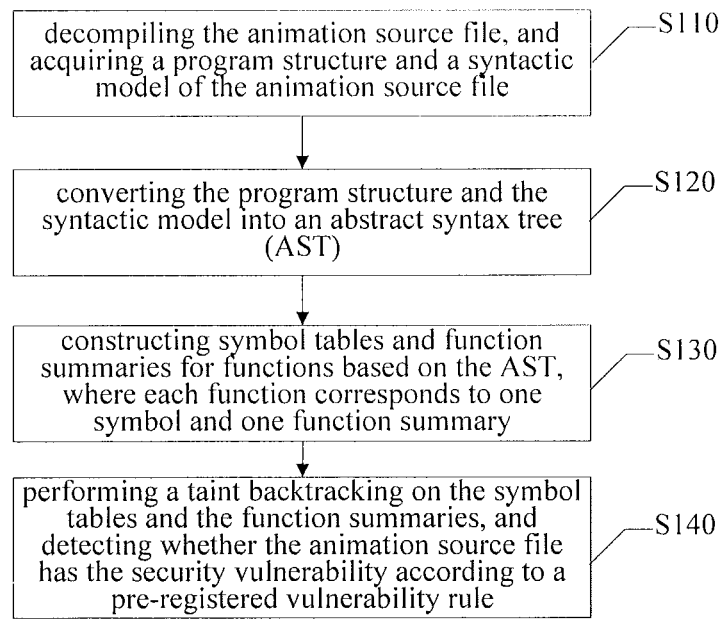
FIG. 2 is a flowchart of a method for detecting a security vulnerability of an automation source file according to a first embodiment of the invention.

FIG. 2 is a flowchart of a method for detecting a security vulnerability for an animation source file according to a first embodiment of the invention. As shown in FIG. 2, the method includes S110 to S140 as follows.

In S110, decompilation is performed on the animation source file and a program structure and a syntactic model of the animation source file are acquired.

The animation source file on which the security vulnerability detection is to be performed is acquired before S110. The animation source file may be acquired directly if the animation source file is stored in a local memory. Alternatively, the animation source file may be downloaded from a network by the transmission unit 106 connected to the network if the animation source file is located in the network. The animation source file may be, for example, a flash file, with a file name extension being ".swf".

After the animation source file is acquired, decompilation is performed on the animation source file to acquire the program structure and the syntactic model of the animation source file. The syntactic model refers to information such as a tree model and a string name set. The tree model is a temporary memory structure which includes lexical and syntactic information of the program such as key information of a control structure and an arithmetic operation.

In S120, the program structure and the syntactic model are converted into an abstract syntax tree (AST).

A program structure of each class or each frame is constructed firstly, and then a treeItem of the syntactic model is translated into a node of the AST, to construct the whole AST, where each treeItem of the syntactic model corresponds to a node of the AST.

In S130, symbol tables and function summaries for functions of the animation source file are constructed based on the AST, where each function of the animation source file corresponds to one symbol table and one function summary.

Each function in a class corresponds to a symbol table. The symbol table includes a data relationship of the function such as an assignment relationship, a function call relationship, a variable declaration, formal parameter information, and a return statement. The symbol table includes two two-dimensional mapping tables, i.e., a variable type table and a variable value table. The variable type table is a record for declaring a type of a variable in the function. The variable value table is data association of the variable in the function.

The symbol table is constructed by acquiring a root node of a function from the AST, extracting information of a formal parameter of the function, obtaining a root node of the body of the function, recursively acquiring each concerned child node of the root node of the function, and extracting key information of the child node. The concerned child node may be, for example, an assignment node, a function call node, a variable declaration node, and a return node. The key information includes, for example, a variable name, variable declaration information, and correlation information. For example, for a SetProperty, a variable name a is acquired, a rvalue object b (an object including information such as a line and a function of the object and the AST node) is constructed, and <a, b> is added into a variable value table of the symbol table. Variable declaration information is also added into the variable type table in a recursive analysis.

The function summary mentioned above includes multiple mapping tables, which include, for example, a relationship between a return value and a formal parameter, a relationship between a return value and a member variable, a relationship between a member variable and a formal parameter or other member variable, a relationship between a formal parameter and other parameter or member variable. The process of establishing the above structure is the process of constructing the function summary. Taking an association of a return value as an example, all return nodes in the function need to be traversed, and the return expression of the return node is backtracked to determined whether the return expression is associated with a formal parameter of the function, and if the return expression is associated with a formal parameter of the function, the location of the formal parameter with which the return expression is associated is determined, and the association result may be stored in a corresponding mapping table.

In S140, a taint backtracking is performed on the symbol tables and the function summaries, and it is detected whether the animation source file has the security vulnerability according to a pre-registered vulnerability rule.

For a given intraprocedural variable, expression and member variable, backtracking is performed to iteratively search for an association latest to the current backtracked variable based on information of the symbol table, until no association is found or the variable value is stable, and a state such as a safe state and a dangerous state is returned. In a case that the latest association is assignment, a rvalue is backtracked. In a case that the latest association is a function call, it is detected whether a function summary is constructed for the called function, the function summary is constructed in real time in a case that the function summary is not constructed, an association between a return value and a parameter of the function is acquired, and the associated parameter is continued to be backtracked. In a case that the current backtracked variable is a class member variable, the association may refer to an implicit pass called by other function in the class (the function affects a value of the class member variable), and the latest association of the class member variable needs to be backtracked.

A vulnerability result found in S140 may be stored into a list, and may be output after the backtracking is finished.

In the method for detecting the security vulnerability for the animation source file according to the embodiment of the invention, the animation source file is converted into the AST automatically, and the symbol table and the function summary are constructed based on the AST. In this way, whether a variable indicates that the animation source file has the security vulnerability can be backtracked in an infinite iteration way, and transfer of external malicious data in the program and generation of the vulnerability can be backtracked. Therefore, the detection rate for the vulnerability is improved.

A method for detecting a security vulnerability for an animation source file is provided according to a second embodiment of the invention. The second embodiment is similar to the first embodiment and differs from the first embodiment in that, S140 includes circularly detecting each function call based on the symbol table to determine whether the called function is a pre-registered dangerous function, and in a case that the called function is the pre-registered dangerous function, detecting a parameter of the dangerous function, and in a case that the parameter is a pre-defined key parameter, backtracking the key parameter and determining whether the key parameter indicates that the animation source file has the security vulnerability.

Figure 3:
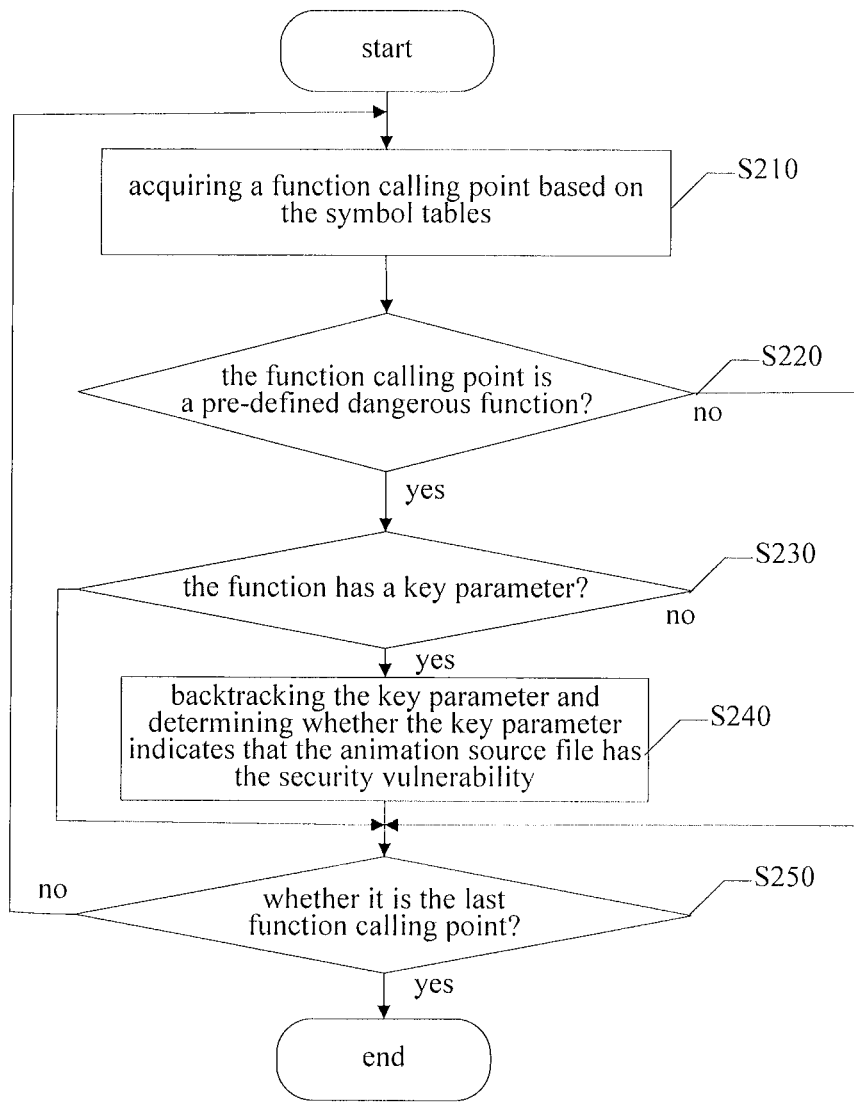
FIG. 3 is a flowchart of a method for detecting a security vulnerability of an automation source file according to a second embodiment of the invention.

Referring to FIG. 3, S140 may include S210 to S250 as follows.

In S210, a function call is acquired based on the symbol table.

In S220, whether the called function is a pre-registered dangerous function is determined; and in a case that the called function is the pre-registered dangerous function, S230 is performed, and in a case that the called function is not the pre-registered dangerous function, S250 is performed. The pre-registered dangerous function refers to a function with security risk, for example, a getURL function for reading external resource.

In an implementation, a list of the dangerous function is stored in one or more configuration files. Therefore, before S220, the method may further include: reading a configuration file and acquiring the pre-registered dangerous function list, a security function list and an external data source list from the configuration file. The backtracking ends when the backtracking is performed to a function in the security function list, and a safe state is returned. The backtracking ends when the backtracking is performed to a function or a variable in the external data source list, and a dangerous state is returned.

In S230, whether the function has a key parameter is determined; in a case that the function has the key parameter, S240 is performed, and in a case that the function does not have the key parameter, S250 is performed. The key parameter refers to a parameter which can affect security. Taking the getURL function as an example, only a resource locator in the getURL function is the key parameter.

In S240, the key parameter is backtracked and whether the key parameter indicates that the animation source file has the security vulnerability is determined.

In an example, S240 includes: acquiring an expression of the key parameter, the expression corresponding to at least one node; and determining a type of each of the at least one node, wherein the type of each of the at least one node comprises a variable, a function call, and a constant; in a case that the node is the variable, backtracking the variable and determining whether the variable indicates that the animation source file has the security vulnerability; in a case that the node is the function call, acquiring a function summary of a called function or constructing a function summary in real time in a case that the called function has no function summary, and recursively backtracking an associated value or associated class member variable of the called function based on the function summary and determining whether the associated value or the associated class member variable of the called function indicates that the animation source file has the security vulnerability; in a case that the node is a constant, returning an indication indicating that no security vulnerability exists; and in a case that the node is in other type, backtracking an expression of a child node of the node and determining whether the expression of the child node of the node indicates that the animation source file has the security vulnerability.

The process of backtracking the variable and determining whether the variable indicates that the animation source file has the security vulnerability may include:

in a case that the variable is an external input variable, returning an indication indicating that the security vulnerability exists; in a case that the variable is a non-string variable, returning an indication indicating that no security vulnerability exists; in a case that no association or definition is found for the variable, returning an indication indicating the security vulnerability exists; in a case that the variable has a latest associated value, recursively backtracking the associated value and determining whether the associated value indicates that the animation source file has the security vulnerability, and taking a backtracking result of the associated value as a backtracking result of the variable; in a case that the variable does not have a latest associated value and the variable is a class member variable, recursively backtracking the class member variable and determining whether the class member variable indicates that the animation source file has the security vulnerability, and taking a backtracking result of the class member variable as a backtracking result of the variable.

In an example, the process of recursively backtracking the associated value and determining whether the associated value indicates that the animation source file has the security vulnerability includes: in a case that the type of the associated value is assignment, recursively backtracking a rvalue expression of the assignment and determining whether the rvalue expression of the assignment indicates that the animation source file has the security vulnerability; and in a case that the type of the associated value is a function call, acquiring an associated value of the associated value from the function summary of the called function, and backtracking the acquired associated value and determining whether the associated value indicates that the animation source file has the security vulnerability.

In an example, the process of recursively backtracking the class member variable and determining whether the class member variable indicates that the animation source file has the security vulnerability includes: acquiring a latest associated assignment of the class member variable or a function call affecting a value of the member variable; acquiring an associated value of the class member variable; and recursively backtracking the associated value of the class member variable and determining whether the associated value of the class member variable indicates that the animation source file has the security vulnerability.

In S250, whether it is the last function call is determined based on the symbol table; and in a case that it is the last function call, the process ends; and in a case that it is not the last function call, the process returns to S210.

In the method for detecting the security vulnerability for the animation source file according to the embodiment of the invention, the animation source file is converted into the AST automatically, and the symbol table and the function summary are constructed based on the AST. In this way, whether a variable indicates that the animation source file has the security vulnerability can be backtracked in an infinite iteration way, and the detection rate for the vulnerability is improved.

Figure 4:
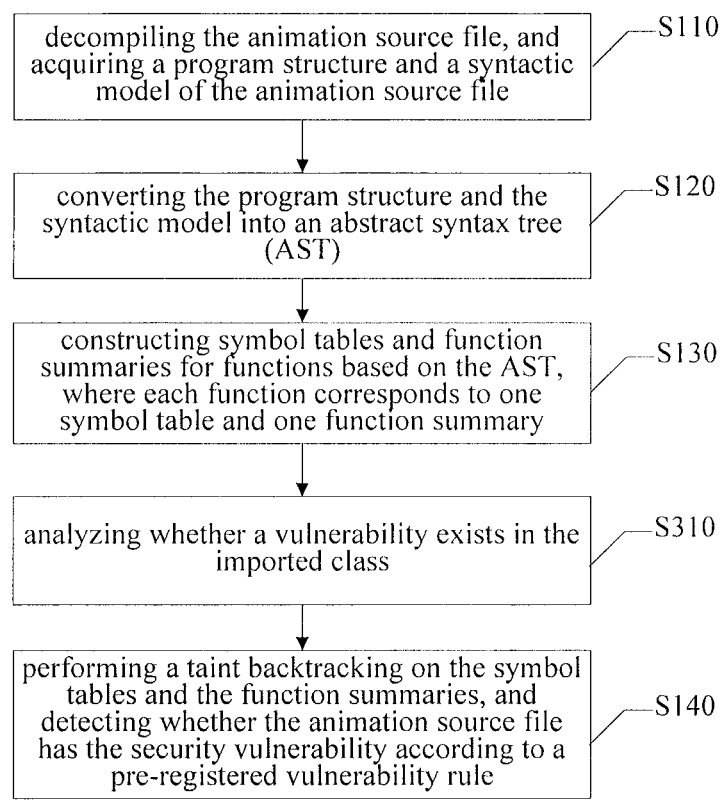
FIG. 4 is a flowchart of a method for detecting a security vulnerability of an automation source file according to a third embodiment of the invention.

A method for detecting a security vulnerability for an animation source file is provided according to a third embodiment of the invention. The third embodiment is similar to the first embodiment and differs from the first embodiment in that, the third embodiment further includes S310 before S140, referring to FIG. 4. S310 includes collecting a class name of the animation source file, a package name of the animation source file, a name of an imported class of the animation source file and class member variable information of the animation source file based on the AST, analyzing whether a vulnerability exists in the imported class, and constructing a summary for the imported class.

In may be understood that, in order to make the program structure clearer, different program modules are stored in different files in a process of programming. A program module stored in another file may be imported into a current program module by an import statement (for example, import). The imported program module may import other program module. These program modules are all executed. In detecting the vulnerability of the animation source file, if the imported modules are not detected, missing detection of the vulnerability may occur. Therefore, in the method of the embodiment, taint backtracking is performed on the imported modules before the taint backtracking is performed on the current program module, which reduces probability of missing detection of the security vulnerability.

Figure 5:
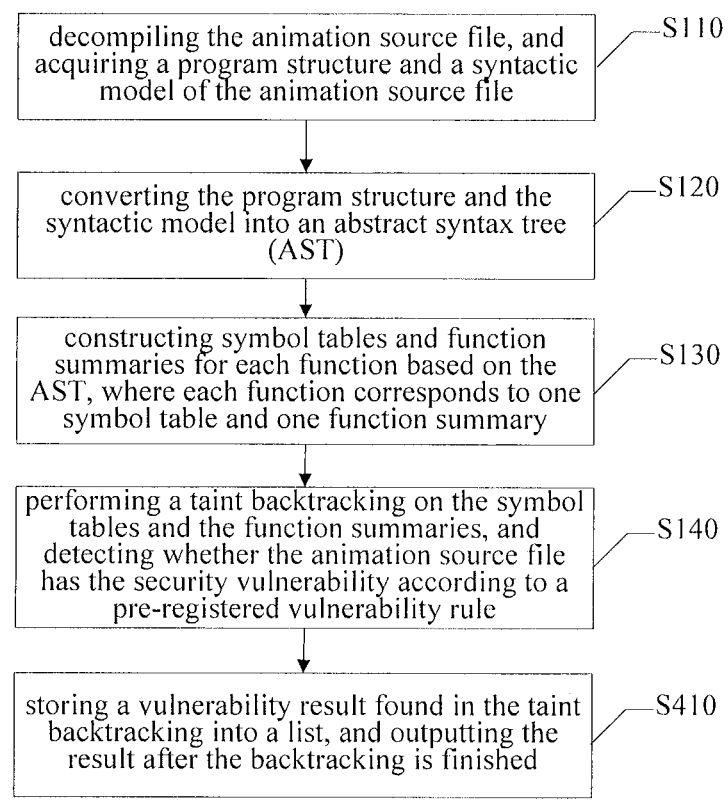
FIG. 5 is a flowchart of a method for detecting a security vulnerability of an automation source file according to a fourth embodiment of the invention.

A method for detecting a security vulnerability for an animation source file is provided according to a fourth embodiment of the invention. The fourth embodiment is similar to the first embodiment and differs from the first embodiment in that, the fourth embodiment further includes S410 after S140, referring to FIG. 5. S410 includes storing a backtracking result into a list, and outputting the backtracking result after the backtracking is finished.

The following information may be recorded for each vulnerability: a type of the vulnerability, a triggering node at which the backtracking is started and a data stream track. The function name and line number in the triggering node and the track are used to locate the triggering node and the track in the codes, so as to find source codes of the triggering node and the track.

In the method for detecting the security vulnerability for the animation source file according to the embodiment of the invention, each vulnerability may be output in an intuitive manner, in this way, it is convenient for a user to view and acknowledge the backtracking artificially.

It may be understood that, although the method for detecting the security vulnerability for the animation source file is described above according to the embodiments, the embodiments are not intent to limit the method described above. Those skilled in the art can make simple changes on the embodiments described above, or combine steps in the embodiments described above to obtain a new embodiment. These new embodiments also fall within the scope of the method described above.

Figure 6:
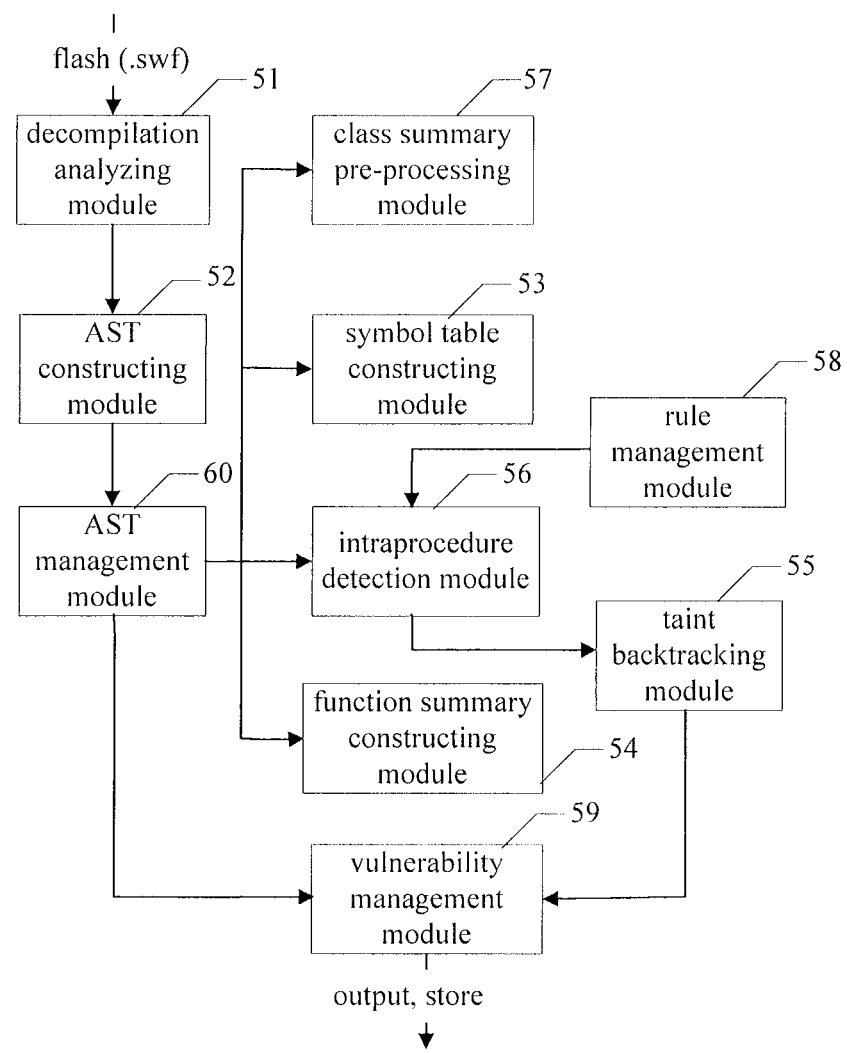
FIG. 6 is a flowchart of a method for detecting a security vulnerability of an automation source file according to a fifth embodiment of the invention.

An apparatus for detecting a security vulnerability for an animation source file is provided according to a fifth embodiment of the invention. Referring to FIG. 6, the apparatus includes a decompilation analyzing module 51, an Abstract Syntax Tree (AST) constructing module 52, a symbol table constructing module 53, a function summary constructing module 54 and a taint backtracking module 55.

The decompilation analyzing module 51 is configured to decompile the animation source file, and to acquire a program structure and a syntactic model of the animation source file.

The AST constructing module 52 is configured to convert the program structure and the syntactic model into an AST.

The symbol table constructing module 53 is configured to construct symbol tables for functions of the animation source file based on the AST, where each function of the animation source file corresponds to one symbol table.

The function summary constructing module 54 is configured to construct function summaries for functions of the animation source file based on the AST, where each function of the animation source file corresponds to one function summary.

The taint tracking module 55 is configured to perform a taint backtracking based on the symbol table and the function summary, and output a backtracking result. Specifically, the taint tracking module 55 is configured to: acquire an expression of a parameter, the expression corresponding to at least one node; determining a type of each of the at least one node, wherein the type of each of the at least one node comprises a variable, a function call, and a constant; in a case that the node of the expression is the variable, backtrack the variable and determine whether the variable indicates that the animation source file has the security vulnerability; in a case that the node of the expression is the function call, acquire a function summary of a called function and recursively backtrack an associated value or associated class member variable of the called function based on the function summary and determine whether the associated value or the associated class member variable of the called function indicates that the animation source file has the security vulnerability; in a case that the node of the expression is the constant, determine that the key parameter indicates that no security vulnerability is in the animation source file; and in a case that the node of the expression is in other type, backtrack an expression of a child node of the node and determine whether the expression of the child node of the node indicates that the animation source file has the security vulnerability.

The taint tracking module 55 backtracking the variable and determining whether the variable indicates that the animation source file has the security vulnerability includes: in a case that the variable is an external input variable, determining that the variable indicates that the animation source file has the security vulnerability; in a case that the variable is in a non-string variable, determining that the variable indicates that no security vulnerability is in the animation source file; in a case that no association or definition is found for the variable, determining that the variable indicates that the animation source file has the security vulnerability; in a case that the variable has a latest associated value, recursively backtracking the associated value and determining whether the associated value indicates that the animation source file has the security vulnerability, and taking a backtracking result of the associated value as a backtracking result of the variable; and in a case that the variable has no latest associated value and the variable is a class member variable, recursively backtracking the class member variable and determining whether the class member variable indicates that the animation source file has the security vulnerability, and taking a backtracking result of the class member variable as a backtracking result of the variable.

The taint tracking module 55 recursively backtracking the associated value and determining whether the associated value indicates that the animation source file has the security vulnerability includes: in a case that a type of the associated value is assignment, recursively backtracking a rvalue expression of the assignment and determining whether the rvalue expression of the assignment indicates that the animation source file has the security vulnerability; and in a case that a type of the associated value is a function call, acquiring an associated value of the associated value from a function summary of a called function, and backtracking the acquired associated value and determining whether the acquired associated value indicates that the animation source file has the security vulnerability.

The taint tracking module 55 recursively backtracking the class member variable and determining whether the class member variable indicates that the animation source file has the security vulnerability includes: acquiring a latest associated assignment of the class member variable or a function call affecting a value of the member variable; in a case that there is the latest associated assignment or the function call, acquiring an associated value of the class member variable; and recursively backtracking the associated value of the class member variable and determining whether the associated value of the class member variable indicates that the animation source file has the security vulnerability.

The apparatus may further include an intraprocedure detection module 56, which is configured to circularly traverse a function call of the animation source file based on the symbol table and determine whether a called function is a dangerous function pre-registered, and in a case that the called function is the dangerous function, detect whether a parameter of the dangerous function is a key parameter pre-defined, and in a case that the parameter is the key parameter, trigger the taint backtracking module to backtrack the key parameter and determine whether the key parameter indicates that the animation source file has the security vulnerability.

The apparatus may further include a class summary pre-processing module 57, which is configured to collect a class name of the animation source file, a package name of the animation source file, a name of an imported class of the animation source file and class member variable information of the animation source file based on the AST, and firstly analyze whether the security vulnerability exists in the imported class.

The apparatus may further include a rule management module 58, which is configured to read a configuration file, acquire a pre-registered dangerous function list, a security function list and an external data source list from the configuration file.

The apparatus may further include a vulnerability management module 59, which is configured to store a backtracking result into a list, and output the backtracking result after the backtracking is finished.

The apparatus may further include an AST management module 60, which is configured to manage the AST constructed by the AST constructing module 52, and return information about the AST and information of source codes of the vulnerability point AS based on a request from other module.

Other details of the apparatus according to the embodiment may refer to the method for detecting the vulnerability for the animation source file in the embodiments described above, and are not described herein.

In the apparatus for detecting the security vulnerability for the animation source file according to the embodiment, the animation source file may be converted into the AST automatically, and the symbol table and the function summary are constructed based on the AST. In this way, whether a variable indicates that the animation source file has the security vulnerability can be backtracked in an infinite iteration way, and transfer of external malicious data in the program and generation of the vulnerability can be backtracked. Therefore, the detection rate for the vulnerability is improved.

A computer-readable medium is further provided according to a sixth embodiment of the invention. The computer readable medium may be stored in the memory 104 of the computer 100 and executed by the processor 102 of the computer 100 described above.

In the embodiment, the processor 102 of the computer 100 may execute the computer-readable medium stored in the memory 104 according to the following instructions, to achieve various functions: decompiling the animation source file and acquiring a program structure and a syntactic model of the animation source file; converting the program structure and the syntactic model into an abstract syntax tree (AST); constructing symbol tables and function summaries for functions of the animation source file based on the AST, where each function of the animation source file corresponds to one symbol table and one function summary; and performing a taint backtracking on the symbol tables and the function summaries and detecting whether the animation source file has the security vulnerability according to a pre-registered vulnerability rule.

In an implementation, the performing a taint backtracking on the symbol tables and the function summaries may include: traversing a function call based on the symbol tables and determining whether a called function is a dangerous function pre-registered, and in a case that the called function is the dangerous function, detecting whether a parameter of the dangerous function is a key parameter pre-defined, and in a case that the parameter is the key parameter, backtracking the parameter and determining whether the key parameter indicates that the animation source file has the security vulnerability.

In an implementation, the backtracking the parameter and determining whether the parameter indicates that the animation source file has the security vulnerability may include: acquiring an expression of the parameter, the expression corresponding to at least one node; determining a type of each of the at least one node, where the type of each of the at least one node comprises a variable, a function call, and a constant; in a case that the node is the variable, backtracking the variable and determining whether the variable indicates that the animation source file has the security vulnerability; in a case that the node is the function call, acquiring a function summary of a called function or constructing a function summary of the called function in real time upon a condition that the called function has no function summary, recursively backtracking an associated value or associated class member variable of the called function based on the function summary, and determining whether the associated value or the associated class member variable of the called function indicates that the animation source file has the security vulnerability; in a case that the node is the constant, determining that the parameter indicates that no security vulnerability is in the animation source file; and in a case that the node is in other type, backtracking an expression of a child node of the node and determining whether the expression of the child node indicates that the animation source file has the security vulnerability.

In an implementation, the backtracking the variable and determining whether the variable indicates that the animation source file has the security vulnerability may include: in a case that the variable is an external input variable, determining that the variable indicates that the animation source file has the security vulnerability; in a case that the variable is in a non-string variable, determining that the variable indicates that no security vulnerability is in the animation source file; in a case that no association or definition is found for the variable, determining that the variable indicates that the animation source file has the security vulnerability; in a case that the variable has a latest associated value, recursively backtracking the associated value and determining whether the associated value indicates that the animation source file has the security vulnerability; and in a case that the variable has no latest associated value and the variable is a class member variable, recursively backtracking the class member variable and determining whether the class member variable indicates that the animation source file has the security vulnerability.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure.

The invention claimed is:

1. A method for detecting a security vulnerability for an animation source file implemented by a computer communicatively coupled to a network wherein the computer includes one or more processors, a memory and a communication unit, the computer by a transmission unit, the method comprising:
   receiving by the communication unit the animation source file;
   decompiling by the processor the animation source file, and acquiring a program structure and a syntactic model of the animation source file;
   converting the program structure and the syntactic model into an abstract syntax tree (AST);
   constructing symbol tables and function summaries for functions of the animation source file based on the AST, wherein each function of the animation source file corresponds to one symbol table and one function symbol; and
   performing a taint backtracking on the symbol tables and the function summaries, and detecting whether the animation source file has the security vulnerability according to a pre-registered vulnerability rule.

2. The method of claim 1, wherein performing the taint backtracking and detecting whether the animation source file has the security vulnerability comprises:
   traversing a function call of the animation source file based on the symbol tables;
   determining whether a called function is a pre-registered dangerous function;
   in a case that the called function is the dangerous function, detecting whether a parameter of the dangerous function is a pre-defined key parameter; and
   in a case that the parameter is the key parameter, backtracking the parameter and determining whether the parameter indicates that the animation source file has the security vulnerability.

3. The method of claim 2, wherein backtracking the parameter and determining whether the parameter indicates that the animation source file has the security vulnerability comprises:
   acquiring an expression of the parameter, the expression corresponding to at least one node; and
   determining a type of each of the at least one node, wherein the type of each of the at least one node comprises a variable, a function call, or a constant;
   in a case where the at least one node is the variable, backtracking the variable and determining whether the variable indicates that the animation source file has the security vulnerability;
   in a case where the at least one node is the function call, acquiring a function summary of a called function or constructing a function summary of the called function in real time upon a condition that the called function has no function summary, recursively backtracking an associated value or associated class member variable of the called function based on the function summary, and determining whether the associated value or the associated class member variable of the called function indicates that the animation source file has the security vulnerability;
   in a case where the at least one node is the constant, determining that the parameter indicates that no security vulnerability is in the animation source file; and
   in a case where the node is in other type, backtracking an expression of a child node of the node and determining whether the expression of the child node indicates that the animation source file has the security vulnerability.

4. The method of claim 3, wherein backtracking the variable and determining whether the variable indicates that the animation source file has the security vulnerability comprises:
   in a case where the variable is an external input variable, determining that the variable indicates that the animation source file has the security vulnerability;
   in a case where the variable is in a non-string variable, determining that the variable indicates that no security vulnerability is in the animation source file;
   in a case where no association or definition is found for the variable, determining that the variable indicates that the animation source file has the security vulnerability;
   in a case where the variable has a latest associated value, recursively backtracking the associated value and determining whether the associated value indicates that the animation source file has the security vulnerability; and
   in a case where the variable has no latest associated value and the variable is a class member variable, recursively backtracking the class member variable and determining whether the class member variable indicates that the animation source file has the security vulnerability.

5. The method of claim 4, wherein recursively backtracking the class member variable and determining whether the class member variable indicates that the animation source file has the security vulnerability comprises:
   acquiring a latest associated assignment of the class member variable or a function call affecting a value of the class member variable;
   acquiring an associated value of the class member variable; and
   recursively backtracking the associated value of the class member variable and determining whether the associated value of the class member variable indicates that the animation source file has the security vulnerability.

6. The method of claim 3, wherein recursively backtracking the associated value and determining whether the associated value indicates that the animation source file has the security vulnerability comprises:
   in a case where a type of the associated value is assignment, recursively backtracking a rvalue expression of the assignment and determining whether the rvalue expression of the assignment indicates that the animation source file has the security vulnerability.

7. The method of claim 3, wherein recursively backtracking the associated value and determining whether the associated value indicates that the animation source file has the security vulnerability comprises:
in where a type of the associated value is a function call, acquiring an associated value of the associated value from a function summary of a called function, and backtracking the acquired associated value and determining whether the acquired associated value indicates that the animation source file has the security vulnerability.

8. The method of claim 1, further comprising:
collecting a class name of the animation source file, a package name of the animation source file, a name of an imported class of the animation source file and class member variable information of the animation source file based on the AST, analyzing whether the security vulnerability exists in the imported class, and constructing a summary for the imported class.

9. The method of claim 1, further comprising:
reading a configuration file, and acquiring a pre-registered dangerous function list, a security function list and an external data source list from the configuration file;
ending the backtracking when the backtracking is performed to a function in the security function list, and returning an indication indicating that no security vulnerability exists; and
ending the backtracking when the backtracking is performed to a function or a variable in the external data source list, and returning an indication indicating that the security vulnerability exists.

10. The method of claim 1, wherein constructing the symbol table based on the AST comprises:
acquiring a root node of the function from the AST, and extracting a formal parameter of the function;
recursively acquiring concerned child nodes of the root node of the function, and extracting key information of the concerned child nodes, wherein each of the concerned child nodes comprises an assignment node, a function call node, a variable declaration node and a return node, and the key information comprises a variable name, variable declaration information and correlation information; and
storing the formal parameter and the key information into a two-dimensional mapping table.

11. The method of claim 1, wherein constructing the function summary based on the AST comprises:
traversing all nodes of each function in a class;
acquiring a relationship between a return value and a formal parameter, a relationship between a return value and a member variable, a relationship between a member variable and a formal parameter or other member variable, and a relationship between a formal parameter and other parameter or a member variable; and
storing the relationships into a plurality of mapping tables, wherein each of the relationships is stored in one mapping table.

12. An apparatus for detecting a security vulnerability for an animation source file, comprising:
a processor; and
a non-transitory processor-readable medium having processor-executable instructions stored thereon that, when executed by the processor, cause the apparatus to:
decompile the animation source file and acquire a program structure and a syntactic model of the animation source file;
convert the program structure and the syntactic model into an AST;
construct symbol tables for functions of the animation source file based on the AST, wherein each function of the animation source file corresponds to one symbol table;
construct function summaries for functions of the animation source file based on the AST, wherein each function of the animation source file corresponds to one function symbol; and
perform a taint backtracking on the symbol tables and the function summaries, and detect whether the animation source file has the security vulnerability according to a pre-registered vulnerability rule.

13. The apparatus of claim 12, wherein the instructions further cause the apparatus to:
traverse a function call of the animation source file based on the symbol tables and determine whether a called function is a pre-registered dangerous function, and in a case that the called function is the dangerous function, detect whether a parameter of the dangerous function is a pre-defined key parameter, and in a case that the parameter is the key parameter, backtrack the parameter and determine whether the parameter indicates that the animation source file has the security vulnerability.

14. The apparatus of claim 13, wherein the apparatus backtracking the parameter and determining whether the parameter indicates that the animation source file has the security vulnerability comprises:
acquiring an expression of the parameter, the expression corresponding to at least one node; and
determining a type of each of the at least one node, wherein the type of each of the at least one node comprises a variable, a function call, and a constant;
in a case that the node is the variable, backtracking the variable and determining whether the variable indicates that the animation source file has the security vulnerability;
in a case that the node is the function call, acquiring a function summary of a called function or constructing a function summary of the called function in real time upon a condition that the called function has no function summary, and recursively backtracking an associated value or associated class member variable of the called function based on the function summary and determining whether the associated value or the associated class member variable of the called function indicates that the animation source file has the security vulnerability;
in a case that the node is a constant, determining that the parameter indicates that no security vulnerability is in the animation source file; and
in a case that the node is in other type, backtracking an expression of a child node of the node and determining whether the expression of the child node of the node indicates that the animation source file has the security vulnerability.

15. The apparatus of claim 14, wherein backtracking the variable and determining whether the variable indicates that the animation source file has the security vulnerability comprises:
in a case that the variable is an external input variable, determining that the variable indicates that the animation source file has the security vulnerability;
in a case that the variable is in a non-string variable, determining that the variable indicates that no security vulnerability is in the animation source file;
in a case that no association or definition is found for the variable, determining that the variable indicates that the animation source file has the security vulnerability;

in a case that the variable has a latest associated value, recursively backtracking the associated value and determining whether the associated value indicates that the animation source file has the security vulnerability; and in a case that the variable has no latest associated value and the variable is a class member variable, recursively backtracking the class member variable and determining whether the class member variable indicates that the animation source file has the security vulnerability.

16. The apparatus of claim 14, wherein recursively backtracking the associated value and determining whether the associated value indicates that the animation source file has the security vulnerability comprises:

in a case that a type of the associated value is assignment, recursively backtracking a rvalue expression of the assignment and determining whether the rvalue expression of the assignment indicates that the animation source file has the security vulnerability.

17. The apparatus of claim 14, wherein recursively backtracking the associated value and determining whether the associated value indicates that the animation source file has the security vulnerability comprises:

in a case that a type of the associated value is a function call, acquiring an associated value of the associated value from a function summary of a called function, and backtracking the acquired associated value and determining whether the acquired associated value indicates that the animation source file has the security vulnerability.

18. The apparatus of claim 17, wherein the recursively backtracking the class member variable and determining whether the class member variable indicates that the animation source file has the security vulnerability comprises:

acquiring a latest associated assignment of the class member variable or a function cal affecting a value of the member variable;

acquiring an associated value of the class member variable; and recursively backtracking the associated value of the class member variable and determining whether the associated value of the class member variable indicates that the animation source file has the security vulnerability.

19. The apparatus of claim 12, wherein the instructions further cause the apparatus to collect a class name of the animation source file, a package name of the animation source file, a name of an imported class of the animation source file and class member variable information of the animation source file based on the AST, analyze whether the security vulnerability exists in the imported class, and construct a summary for the imported class.

20. The apparatus of claim 12, wherein the instructions further cause the apparatus to read a configuration file and acquire a pre-registered dangerous function list and a security function list from the configuration file, wherein a function in the security function list is not backtracked.

* * * * *